United States Patent [19]

Ogasawara

[11] Patent Number: 4,792,648
[45] Date of Patent: Dec. 20, 1988

[54] TELEMATIC RECEPTION TERMINAL

[75] Inventor: Fumihiro Ogasawara, Yamato, Japan

[73] Assignee: Ricoh Company, Ltd., Tokyo, Japan

[21] Appl. No.: 111,279

[22] Filed: Oct. 22, 1987

[30] Foreign Application Priority Data

Oct. 22, 1986 [JP] Japan .................. 61-249426

[51] Int. Cl.⁴ .................. H04L 17/02; H04L 17/16
[52] U.S. Cl. .................. 178/4; 178/25; 178/17 R
[58] Field of Search .................. 178/25, 17, 4; 370/99; 358/256

[56] References Cited

U.S. PATENT DOCUMENTS 4,677,257 6/1987 Ogasawara .................. 178/4

FOREIGN PATENT DOCUMENTS 1124685 8/1968 United Kingdom .................. 178/4

Primary Examiner—Stafford D. Schreyer
Attorney, Agent, or Firm—Oblon, Fisher, Spivak, McClelland & Maier

[57] ABSTRACT

A method for controlling the sending of a response from a telematic reception terminal (teletex, G4 facsimile, and mixed mode) is provided. The receiver includes a PAMB counter whose count indicates the remaining number of page attribute management function blocks (PAMBs), each including predetermined various attribute data relating to each page, such as line density, coding mode, page size, page number and document number. When one of predetermined commands, such as a page boundary command or a document end command, has been received, the receiver checks to see whether or not the count of the PAMB counter is equal to or larger than a predetermined value. And if it has been found to be equal to or larger than the predetermined value, a response is sent to the transmitter. Thus, the transmitter is permitted to send the information of the following page. On the other hand, if the remaining number has been found to be smaller, then the sending of a response is suspended until the condition of the remaining number being equal to or larger than the predetermined number has been established. The remaining number of PAMBs is incremented every time when recording of a single page has been completed at the receiver.

5 Claims, 7 Drawing Sheets

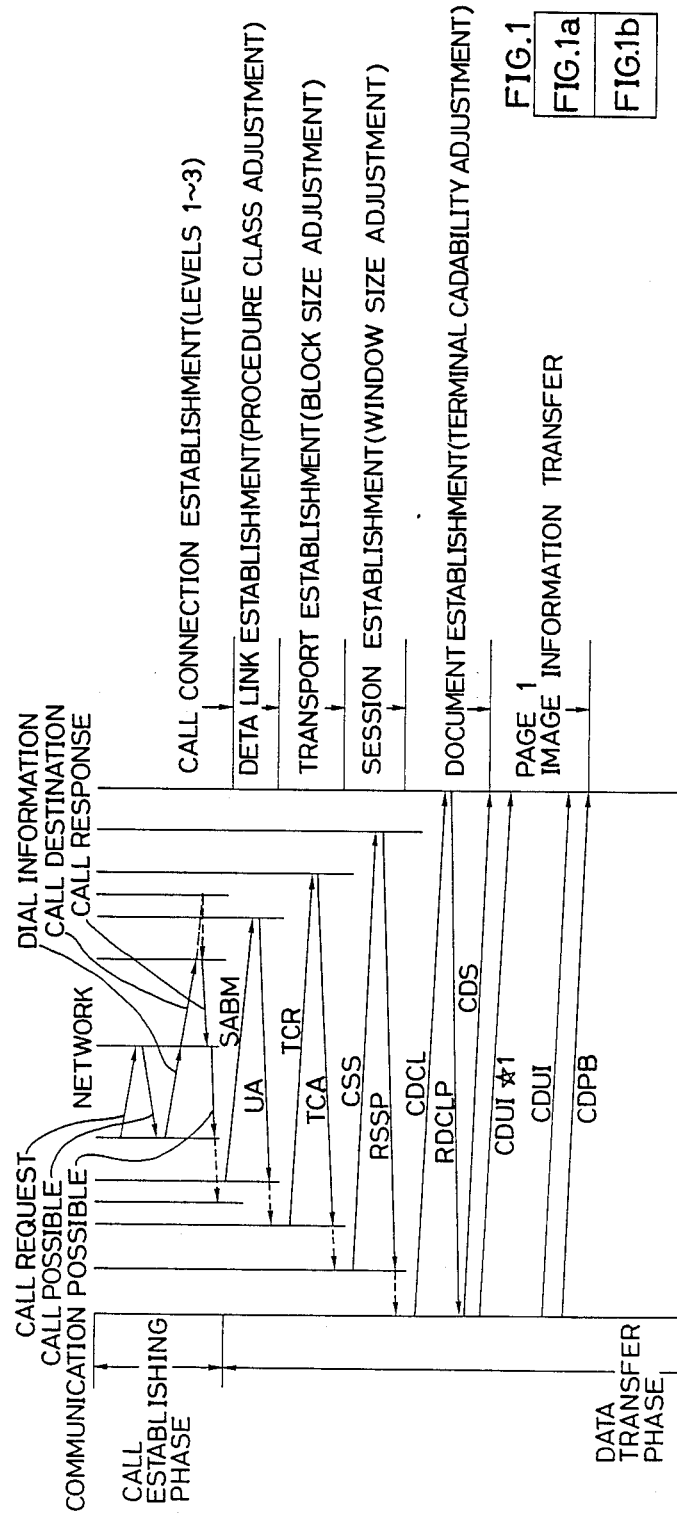

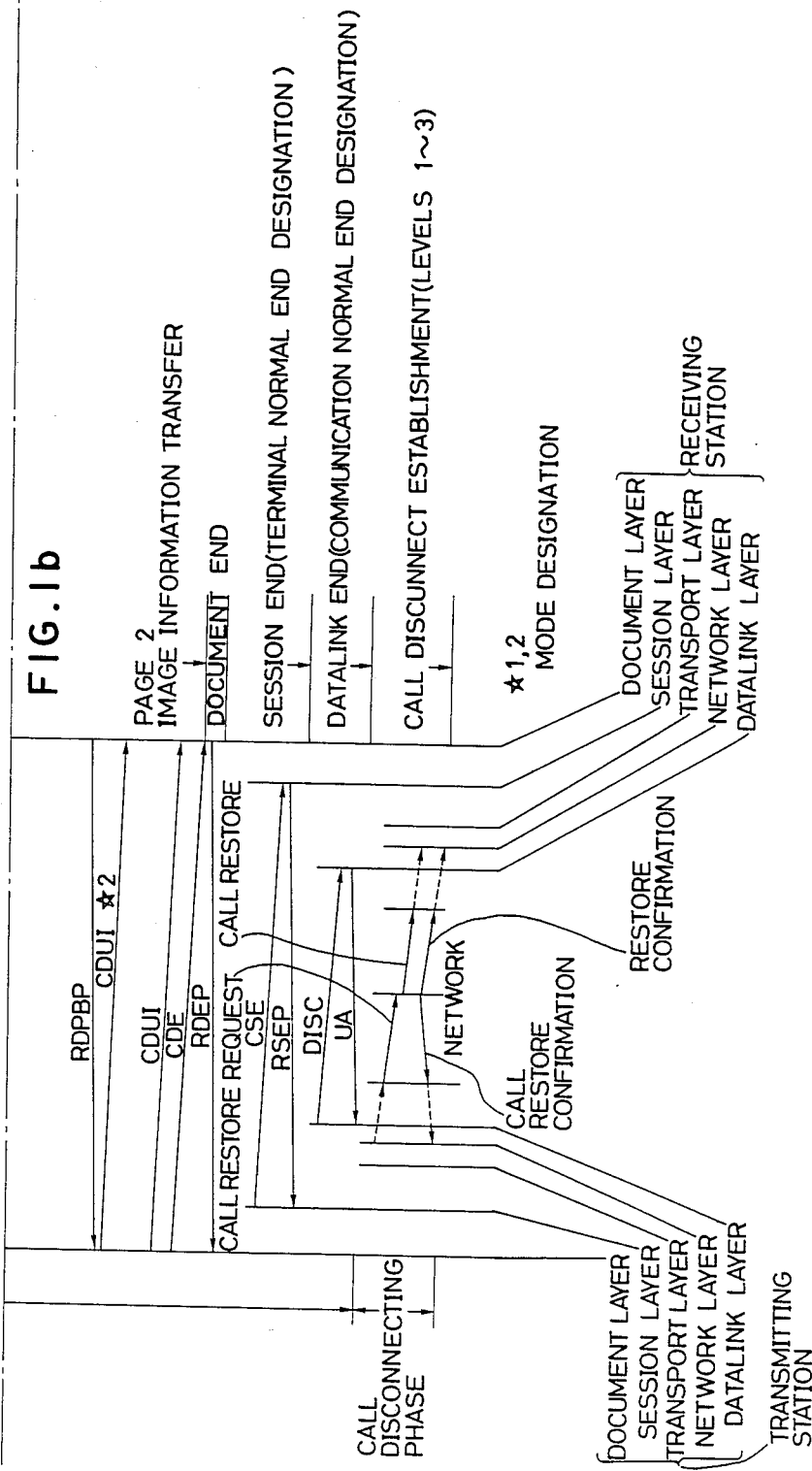

1

TELEMATIC RECEPTION TERMINAL

BACKGROUND OF THE INVENTION

1. Field of the Invention

This invention generally relates to a communication control method and apparatus for use in a communication network, and, in particular, to a control method and apparatus of a telematic reception terminal.

2. Description of the Prior Art

Recently, a research has been carried out on a telematic service (teletex, G4 facsimile, and mix mode machine) terminal, for example, by CCITT, and a control procedure (protocol) or the like for that is being decided. A telematic terminal is a composite terminal serviceable as a teletex terminal, a facsimile terminal, a videotex terminal, or the like. In telematic service, it allows to further improve the image quality and high speed transmission beyond the limits imposed by prior art facsimile machines, including G1, G2 and G3, and a proposal has been made as to a control procedure which allows to carry out communication even between terminals of different types.

SUMMARY OF THE INVENTION

It is therefore a primary object of the present invention to improve the transmission efficiency of such a telematic terminal.

Another object of the present invention is to provide an improved control method in a telematic terminal.

A further object of the present invention is to provide an improved data communication method and apparatus high in efficiency and speed.

A still further object of the present invention is to provide a telematic terminal capable of minimizing the total communication time period.

A still further object of the present invention is to provide a telematic reception terminal capable of selecting the timing of sending a response optimally.

Other objects, advantages and novel features of the present invention will become apparent from the following detailed description of the invention when considered in conjunction with the accompanying drawings.

BRIEF DESCRIPTION OF THE DRAWINGS

FIG. 1 shows how FIGS. 1a and 1b should be combined;

FIGS. 1a and 1b, when combined as illustrated in FIG. 1, show a schematic illustration of a control procedure of G4 facsimile system;

DESCRIPTION OF THE PREFERRED EMBODIMENTS

It is expected that telematic service will be provided by network systems, such as PSDN (Packet-Switched Public Data Network), CSDN (Circuit-Switched Public Data Network), PSTN (Public Switched Telephone Network) and ISDN (Integrated Services Digital Network). It is likely that ISDN will be the main stream in future. In Japan, INS (Information Network System), which is substantially equivalent to ISDN, is now under experimentation for possible practical use in the near future. In the following, the present invention will be described in the case of G4 facsimile.

FIG. 1 illustrates the control procedure of G4 facsimile according to the present invention. In G4 facsimile, such networks as CSDN and INS(ISDN) are suitable from the view point of the amount of information, speed, etc. These networks are high in bit rate and error free due to the application of HDLC (High level Data Link Control) as a control procedure, so that they allow to carry out transmission of image data at high speed and high quality, which could not be provided by the prior art telephone network system of G1, G2 and G3. If the network speed is high, the time required for actual transmission of image information and the time required for the preprocedural control prior to the transmission of image information and for the postprocedural control after the transmission of image information play a major role in the efficiency of overall transmission time. In general, in communication, in order to effect transmission efficiently by matching the speed of an input/output device and the speed of the network, use is typically made of buffering at an appropriate location as shown in FIG. 2.

It is to be noted that FIGS. 1a and 1b, when combined, illustrate the control procedure for transmitting two pages of image information continuously. It should also be noted that, in general, in communication, if it is desired to increase the use rate of the network, buffering is provided for transmitting data from an input/output device to the transmission line and for a receiving system for receiving data from the transmission line, and such buffering is typically constructed by using a memory or the like.

Figure 2:
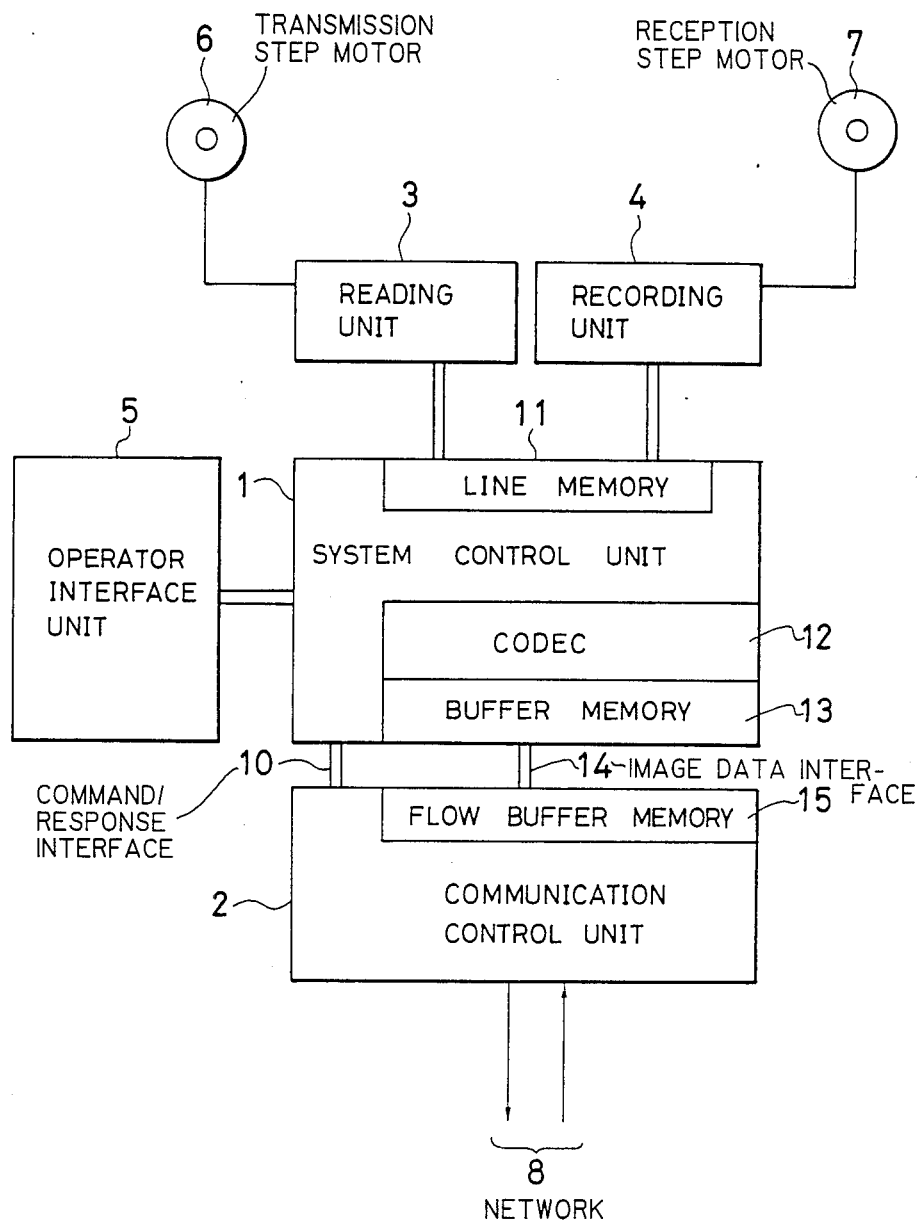
FIG. 2 is a schematic illustration showing the structure of a facsimile terminal constructed in accordance with one embodiment of the present invention.

FIG. 2 schematically illustrates the structure of a facsimile terminal constructed in accordance with one embodiment of the present invention. As shown, the illustrated facsimile terminal includes a system control unit (SCU) 1, a communication control unit (CCU) 2, a reading section (VPU) 3, a recording section (WCU) 4, an operator interface unit (OPU) 5, a transmission step motor 6, a reception step motor 7, a command/response interface 10, a line memory (LM) 11, a coder/decoder (CODEC) 12, a buffer memory (BM) 13, an image data interface 14, and a flow buffer memory (FB) or simply flow buffer 15. The facsimile terminal is connected to a transmission line 8 for transmission and reception of data thereto and therefrom. It is to be noted that, in facsimile, such elements as line memory 11, buffer memory 13 and flow buffer 15 are required.

In the system shown in FIG. 2, the communication control unit 2, reading section 3 and operator interface unit 5 are controlled by the system control unit 1. The system control unit 1 is provided with the coder/decoder or codec 12, which has a coding function for producing coded data by suppressing redundancy from the image information from the reading section 3 and a decoding function for reconstructing the original image information by decoding the coded data upon receipt. According to commands from the system control unit 1, the communication control unit 2 carries out the control procedure for effecting communication with another terminal through the transmission line 8.

The G4 control procedure is a layered procedure which is based on the seven layer OSI model of the ISO standards. Next, the flow of the control procedure for normal transmission and reception of image data will be described with reference to FIGS. 1a and 1b.

(1) Establishment of Call Connection

Typically, using network system provided by a carrier, such as NTT in Japan, the procedure for establishing a call to an intended terminal is carried out. This is determined depending on the kind of network, such as PSTN, PSDN, CSDN, or ISDN (INS), employed.

(2) Establishment of Data Link Layer

As the data link layer, use is made of the HDLC control procedure recommended by CCITT.
SABM: Set ABM mode.
UA: The connection of link layer is established by Unnumbered Accept.

(3) Establishment of Transport Layer

The transport layer establishes a connection by TCR (Transport Connection Request) and TCA (Transport Connection Accept). Furthermore, at this juncture, negotiation is carried out regarding the data block size between the two terminals, thereby determining the number of octets (number of bytes) of a data block to be used in communication.

(4) Establishment of Session Layer

A connection is established by CSS (Command Session Start) and RSSP (Response Session Start Positive). In addition, at this juncture, negotiation is carried out between the two terminals regarding exchange of ID and abbreviation and the window size.

(5) Establishment of Document

The establishment of connection of document layer is carried out by CDCL (Command Document Capability List), RDCLP (Response Document Capability List Positive) and CDS (Command Document Start). In the case of CDCL and RDCLP, negotiation is carried out regarding the capability of each of the terminals. And, the start of image information transmission phase is effected by CDS.

(6) Image Information Transmission

Now, a connection is established between the two terminals through the above-described steps (1) through (5), the image information data is transferred to the lower layer with the addition of CDUI (Command Document User Information) HEADER and sent out to the transmission line as image information. (Also at the lower layer, HEADER processing is carried out at each layer.) Now, mode setting for each page is carried out by the first CDUI for page. Incidentally, the first command of page contains parameters (information) of presentation layer, such as a document layout descriptor, a page layout descriptor and text unit. The mode of its document and page (e.g., CODEC mode, line density, etc.) is designated by these information. In addition, CDUI contains therein the length of image data viewed from the presentation layer as a header by the text information which is a parameter of the text unit of the presentation layer other than the image data.

TRANSMISSION

The image data from the reading section 3 enters the line memory 11 and it is stored into the buffer memory 13 after having been encoded by the codec 12. The data of the buffer memory 13 is sent to the communication control unit 2 and stored in the flow buffer 15 of the communication control unit 2. With this, at the communication control unit 2, the encoded data having entered the flow buffer 15 is transferred to the presentation layer and sent out to the transmission line 8 after having been subjected to header processing. During transmission, buffering between the reading speed and coding/decoding speed is effected between the line memory 11 and the buffer memory 13. On the other hand, buffering between the speed of codec 12 and the speed of the transmission line 8 is effected between the buffer memory 13 and the flow buffer 15. The flow buffer 15 carries out matching of speed with the transmission line 8, and it is used for transmitting an image signal efficiently without interruption.

RECEPTION

The data received from the transmission line 8 is processd at each layer within the communication control unit 2 so as to remove its header, and it is stored into the flow buffer 15 as encoded data. The encoded data within the flow buffer 15 is transferred to the buffer memory 13 and then it is transferred to the line memory 11 as being decoded by the codec 12. The data is then transferred to the recoding section 4 so that recoding of an image is effected. During reception, buffering between the speed of the transmission line 8 and the speed of the codec 12 is effected between the flow buffer 15 and the buffer memory 13. And, buffering between the recoding speed and the speed of the codec 12 is effected between the line memory 11 and the buffer memory 13.

(7) Page Boundary and Document End

During step (6), if there is another original to send upon completion of transmission of the first page, page end is apprised to the receiver by CDPB (Command Document Page Boundary). On the other hand, if the current page, which has been just transmitted, is the last page, then document end is apprised to the receiver by CDE (Command Document End). In response thereto, the receiver sends RDPBP (Response Document Page Boundary Positive) for CDPB and RDEP (Response Document End Positive) for CDE. In these command/responses (hereinafter, also referred to as C/R), a parameter of page number is added, which may be used for page management and communication management by the window size which has been negotiated at the session connection. The above-described response is a positive response. If there is any page which has not been properly received, then use is made of a negative response of RDPBN (Response Document Page Boundary Negative). With CDE and RDEP, the end of document layer connection is effected.

(8) Session End

The end of session connection is effected using CSE (Command Session End) and RSEP (Response Session End Positive). The end of transport layer is at the same time as the end of session layer.

(9) Link Layer End

The connection of link layer is released by DISC (Disconnect) and UA (Unnumbered Accept).

(10) Establishment of Call Disconnection

Upon completion of one communication, the call of the transmission line in hold is released. Similarly with the step (1), this procedure is determined depending on the kind of network used.

As described in step (7), at the page boundary containing a document end, the transmitter transmits a CDPB command to the receiver and waits for a response to RDPBP. Besides, in this case, the negotiation has been carried out with the window size equal to 2 or more, and if the unconfirmed number of pages which have already been sent is smaller than the window size, the transmission of the following page is initiated.

Now, a description will be had as to the timing of returning a response for CDPB/CDE. The sooner the transmission of a response to CDPB/CDE, the less the inactive holding time period of the transmission line. That is, from the viewpoint of reducing the transmission time period, the sooner a response to a command, the better. In the case of facsimile or the like, since an output is effected by hard copy, the point in time when a recording medium has been discharged properly is a desired point as the timing for sending a response. However, as shown in FIG. 2, due to buffering among the line memory 11, buffer memory 13 and flow buffer 15, there still remains a significant amount of data which has yet been decoded and supplied for recording at the time of reception of CDPB/CDE. It is to be noted that discharging of a recording medium takes some time because of involvement of mechanical control.

Under the condition, in order to reduce the invalid time period, the window size is set to be equal to or larger than 2. And, the timing of sending a response is set at the time of reception of CDPB and CDE. It is to be noted, however, that the setting of the window size being equal to or larger than 2 is effective in the case of continuous or multiple transmission, but it is not effective in the case of single transmission. Thus, it is most efficient in shortening the transmission time period if a response is sent immediately upon receipt of CDPB/CDE. If a response is sent immediately upon receipt of a command, there still remains data in such elements as flow buffer 15, buffer memory 13 and line memory 11, as set forth previously. For this reason, after sending of a positive response (RDPBP/RDEP), a further decoding operation is carried out to effect recording and discharging of a recorded image. As a result, there is a risk of occurrence of inconveniences, such as generation of decoding error, overheating of a recording head, and jamming of recording medium. However, regarding decoding error, it is taken care of by the error free function provided by the HDLC procedure, and jamming of recording paper may also be minimized in the number of occurrences by simplification in the design of a mechanical system, so that these two factors do not present appreciable problems.

In accordance with the principle of the present invention, it is so structured that a telematic reception terminal has the number of page attribute management function blocks, or simply PAMBs, which is larger than the page window size determined during the negotiation for Session Connection, and also a plurality of response sending timings. And, the sending of a response from the telematic reception terminal is controlled by the remaining number of PAMBs to thereby determine the most optimum timng for sensing a response to the transmitter. With this structure, the response time for responding to the page boundary command and/or document end command is shortended and thus the transmission efficiency enhanced. As a result, the total communication time period can be minimized.

The page attribute management function blocks or simply PAMBs are blocks each of which stores and manages the attributes of each page to be transmitted from the transmitter to the receiver as indicated at star mark 1 and star mark 2 in FIGS. 1a and 1b. The attributes of each page include, for example, line density, coding mode, page size, page number, document number, and area address of the buffer memory in which the corresponding page is stored. These attribute data must be stored until print out.

In the present example, there are prepared the following two response sending timings.

Figure 3A:
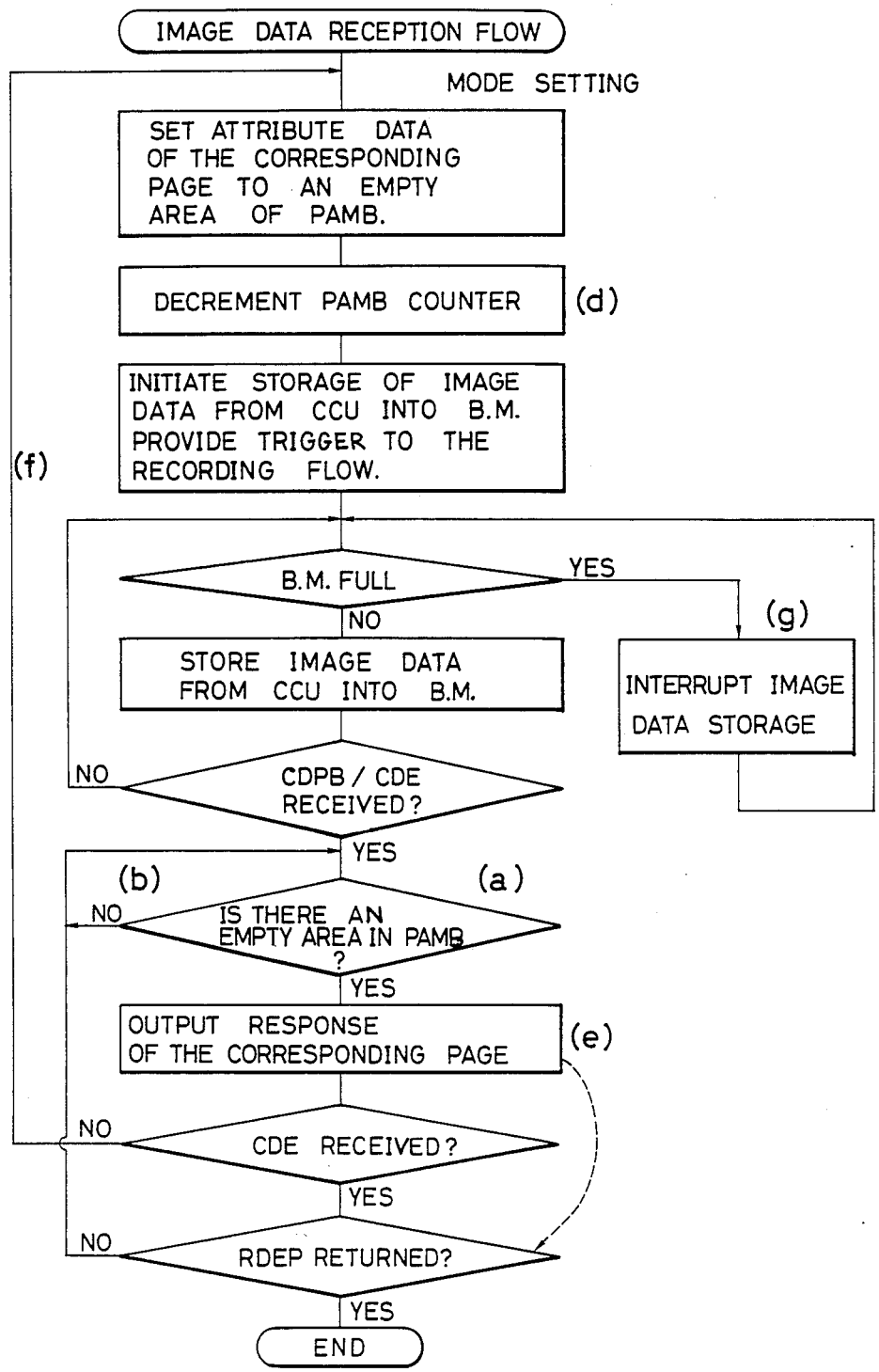
FIG. 3a is a flow chart showing a sequence of steps of a routine for controlling the timing of sending a response employed in the structure shown in FIG. 2 and constructed in accordance with one embodiment of the present invention.
Figure 3B:
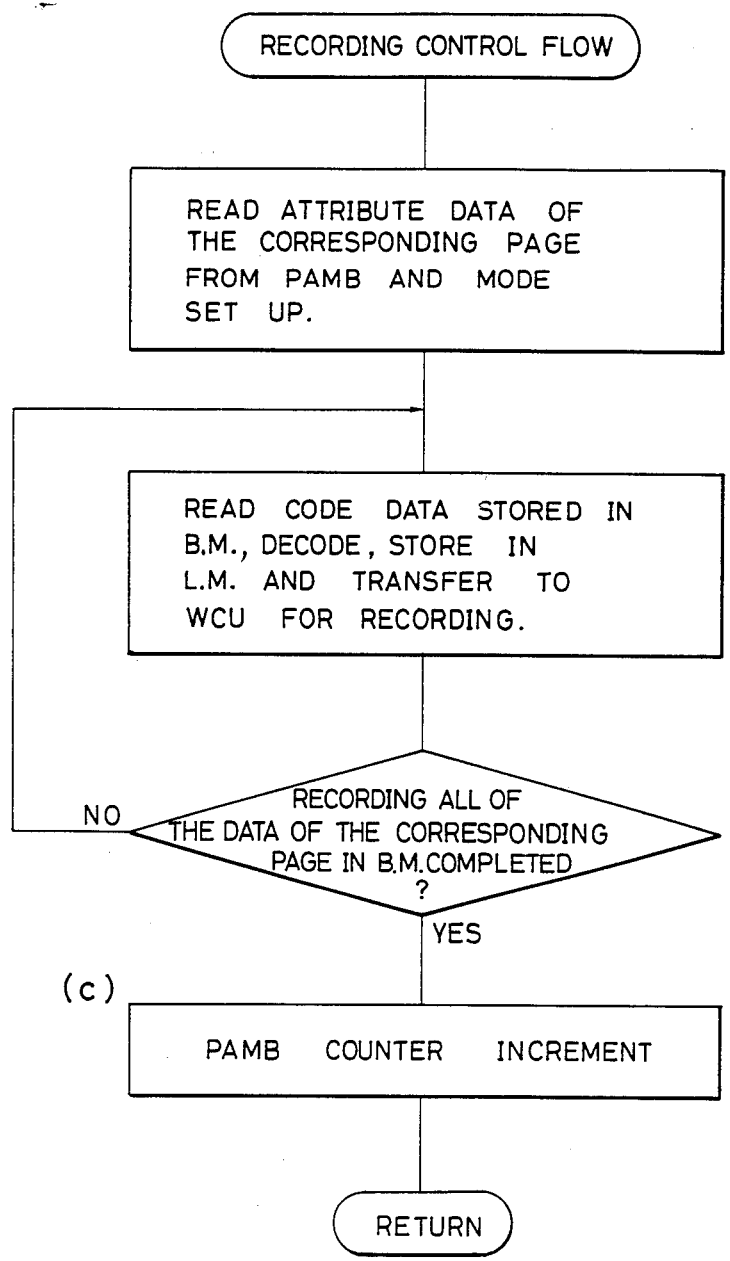
FIG. 3b is a flow chart showing a sequence of steps of a recording control routine employed in the structure shown in FIG. 2 and constructed in accordance with one embodiment of the present invention.

(a) Upon receiving a command; and (b) Upon completion of recording. FIGS. 3a and 3b show a control flow for controlling the response sending timing, and this flow is implemented in the system control unit 1 of the structure shown in FIG. 2. This flow corresponds to a portion of the sequence following star mark 1 in the flow chart of FIG. 1.

FIG. 3a shows a main flow of this control sequence, which mainly carries out storing of attribute data of the corresponding page supplied from the CCU 2 into the PAMB and transferring of image data supplied from the CCU 2 into the B.M. 13 and which operates in the background of this control flow. FIG. 3b shows a sequence of steps for managing the activation of the recording flow and the response sending timing upon receipt of the page boundary command (CDOB and CDE). The response sending timing is controlled by a step (a) in the flow chart of FIG. 3a. That is, it is checked whether or not there is an empty area in the PAMB (counter), and, if there is no empty area, it enters into a loop (b) to thereby wait until an empty area is created in the PAMB. In other words, step (a) in the flow chart of FIG. 3a corresponds to the response sending timing control step, in which it stays in loop (b) as long as the remaining number of PAMBs is equal to 1 or less, in which case, it is regarded as "no empty PAMB."

An empty area in the PAMB is created when the PAMB counter is incremented at step (c) of the flow shown in FIG. 3b. That is, when the recording flow reaches the end of recording of the corresponding page, there is created one empty area in the PAMB. This results in sending or returning a response of CDPB or CDE upon completion of recording at step (e) in the flow of FIG. 3a. The case in which the creation of an empty area in the PAMB is waited in the loop (b) is a case in which the loop (f) in the flow of FIG. 3a is faster than the step (c) in the flow of FIG. 3b, whereby the decrement operation of the PAMB counter at step (d) in the flow of FIG. 3a is carried out at a faster speed than the incrementing operation of the PAMB counter at step (c) in the flow of FIG. 3b. This case occurs when the recording speed for printing out received image data is extremely slower than the image data receiving speed. It is to be noted that here the occurrence of an empty area in the PAMB is determined when the remaining number of PAMBs has become equal to 2 or more.

It goes to step (g) in the flow of FIG. 3a when the page length of received data is too long or the like and thus the buffer memory has become full. In this case, during this loop, no data is transferred from the CCU 2 to the SCU 1. Thus, the CCU 2 sends a signal indicating busy to the transmitter to thereby temporarily hold the transmission of image data from the transmitter to the receiver. As the recording progress with the simultaneous transfer of image data from the buffer memory 13 to the recording unit 4, the original condition is restored to receive further image data from the transmitter.

Figure 4:
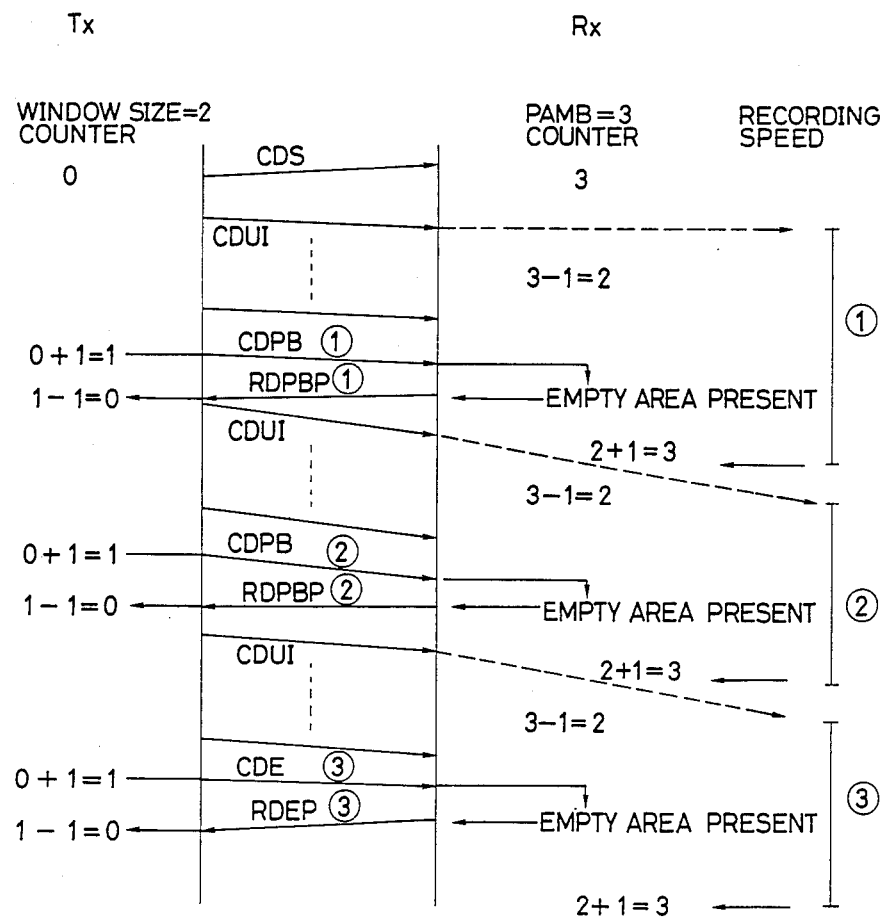
FIG. 4 is a schematic illustration showing an example of communication between a transmitter Tx and a receiver Rx with the window size=2 and the PAMB number=3, in which the recording speed is comparable to the data receiving speed.

Now, specific examples of the present invention will be described with particular reference to FIGS. 4 and 5. In the first place, FIG. 4 illustrates the case of window size=2 and the number of PAMBs=3, in which the data receiving speed is comparable to the recording speed. The occurrence of an empty PAMB is determined when the PAMB counter has a count which is equal to or larger than 2, and the response timing for responding to CDPB/CDE is determined under this condition. As shown in FIG. 4, the condition of the PAMB counter being equal to or larger than 2 is satisfied at the time of receipt of CDPB or CDE, so that a response is returned immediately (i.e., upon receipt of a command), to the transmitter. It is to be noted that the left-hand column indicates the operation at the transmitter and the right-hand column indicates the operation at the receiver.

The window size manages the number of unconfirmed pages by a window size counter under control of the transmitting terminal. The value of the window size which has been determined at the Session Connection indicates the number of pages which can be transmitted from the transmitter to the receiver without confirmation by the receiver (i.e., without receiving a response RDPBP). Thus, in the communication having the window size=1, the transmission of the next page cannot be carried out until a response (RDPBP) has been received from the receiver. In this case, the response sending timing of the receiver plays a significant role in determining the total communication time period. For this reason, in accordance with the principle of the present invention, the response sending timing is so adjusted or controlled that the response sending timing is set as being immediate if there is a room in the remaining number of PAMBs so as to minimize the total communication time period between the transmitter and the receiver. For this purpose, the remaining number of PAMBs must be monitored for management. If there is no room for the remaining number of PAMBs, it is waited until a room or an empty area is created, for example upon completion of recording in the present example, a response is sent.

Thus, the room is provided by the number of PAMBs possessed by the reception terminal. The larger the number of PAMBs as compared with the window size, the larger the room possessed by the reception terminal. Similarly with the above-described case of window size=1, an immediate response RDEP condition is set for CDE also in the single page transmission case, so that the total communication time period can be reduced.

Figure 5:
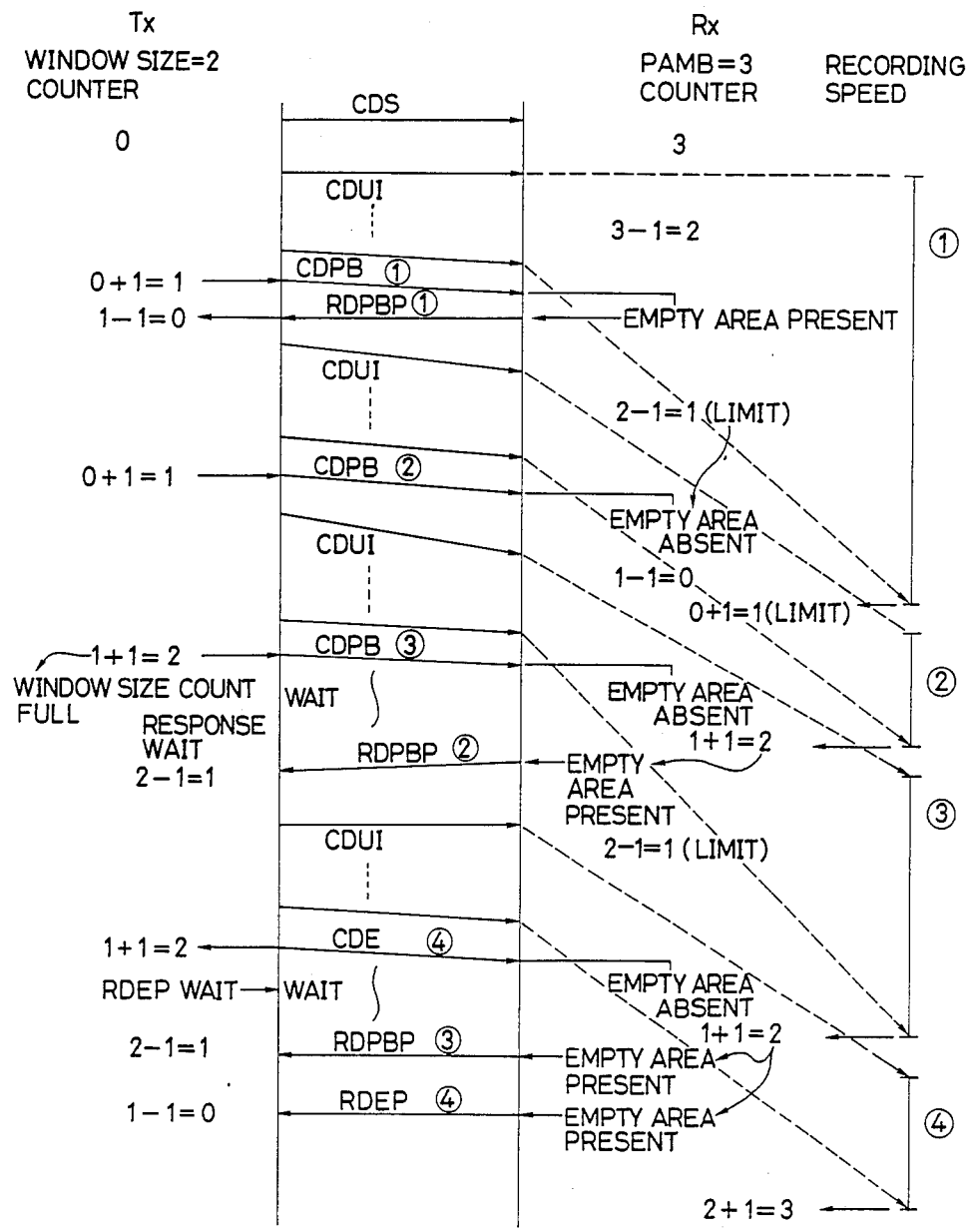
FIG. 5 is a schematic illustration showing another example of communication between a transmitter Tx and a receiver Rx with the window size=2 and the PAMB number=3, in which the recording speed is extremely slower than the data receiving speed.

FIG. 5 illustrates a similar case for communication between the transmitter Tx and the receiver Rx under the same conditions as those of the case shown in FIG. 4, excepting the fact that the recording speed is much slower than the data receiving speed in the present case. This is an extreme example in which the second and third pages are received before completion of recording of the first page. In the illustrated case, a response of RDPBP 1 circled has been sent immediately in response to CDPB 1 circled for the first page because of the presence of an empty area in PAMB. However, a response is retained for CDPB 2 circled for the second page because of the absence of an empty area in PAMB. On the other hand, since the window size is equal to 2, the transmitter Tx has already started to transmit page 3. Then, after transmission of CDPB 3 circled, the number of unconfirmed pages (i.e., window size counter) becomes 2, so that it enters into a stand-by state for waiting to receive a response of RDPBP without initiating the transmission of page 4.

On the other hand, the receiver Rx completes recording of page 1 and then causes the PAMB counter to be incremented, i.e., 0+1=1; however, it does not still result in the creation of an empty condition. Then, the receiver goes on for recording of page 2. Upon completion of recording of page 2, the PAMB counter is again incremented such that 1+1=2, and, thus, the condition of the presence of an empty area is established, thereby sending a response of RDPBP 2 circled to the transmitter Tx. With this, the number of unconfirmed pages at the transmitter Tx becomes 2−1=1, so that the transmitter Tx initiates the transmission of page 4.

In an extreme case as in the present case, the condition for sending a response immediately is established only for a single page, and, thus, a response is sent at the timing of end of recording for the next and subsequent pages. In the present example shown in FIG. 5, although it is an extreme case, the overall communication time period is minimized without causing any problem in management of pages in communication by setting the condition of the number of PAMBs being larger than the window size. In the illustrated example, it is set as the number of PAMBs=window size +1.

As described above in detail, in accordance with the present invention, the timing of sending a response from the receiver to the transmitter is controlled by the remaining number of PAMBs and thus the response sending timing can be selected to be optimal, thereby allowing to minimize the overall communication time period.

While the above provides a full and complete disclosure of the preferred embodiments of the present invention, various modifications, alternate constructions and equivalents may be employed without departing from the true spirit and scope of the invention. For example, it has been described with respect to the case in which the present invention has been applied to a facsimile system. However, it should be understood the the present invention may be applied to a so-called telematic terminal, such as a teletex, if the recording unit for recording received data is substituted by an external memory, such as a floppy disc device or hard disc device. Therefore, the above description and illustration should not be construed as limiting the scope of the invention, which is defined by the appended claims.

What is claimed is:

1. A method for controlling the timing of sending a response to a command received from a transmitter, said command is of the kind which is transmitted from said transmitter to a receiver at the end of transmitting a unit of information to send, such as a page boundary command, comprising the steps of:

receiving said command from said transmitter;

determining whether or not the remaining number of page attribute management function blocks possessed by said receiver is larger than or equal to a predetermined number, said remaining number of page attribute management function blocks being incremented intermittently; and sending a response to said transmitter immediately if said remaining number thus determined has been found to be larger than or equal to said predetermined number; otherwise, holding said response until said remaining number becomes larger than or equal to said predetermined number.

2. The method of claim 1, wherein said remaining number is incremented every time when a recording operation of a single page has been completed.

3. The method of claim 2, wherein said receiver includes a first counter whose count indicates said remaining number of page attribute management function blocks.

4. The method of claim 3, wherein said transmitter includes a second counter whose counts indicates the number of pages which may be transmitted to said receiver without receiving a response from said receiver.

5. The method of claim 4, wherein said predetermined number is set to be larger than the count of said second counter.

* * * * *